M. M. FRANKS.
ANIMAL TRAP.
APPLICATION FILED JULY 25, 1908.
928,649.
Patented July 20, 1909.
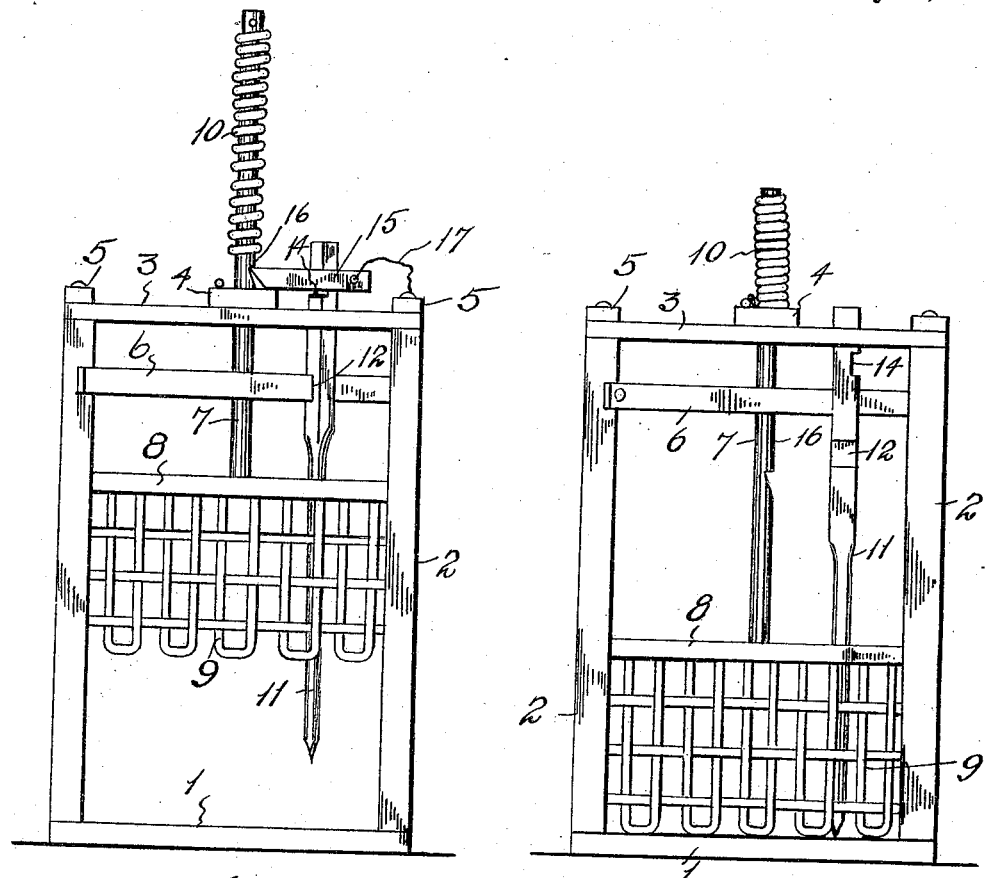
Fig. 1.   Fig. 2.   Fig. 3.   Fig. 4.
WITNESSES:
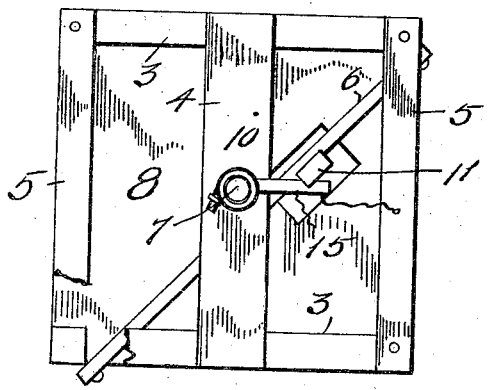
INVENTOR
M. M. Franks.
BY
ATTORNEY

UNITED STATES PATENT OFFICE.

MARION M. FRANKS, OF CORSICANA, TEXAS.

ANIMAL-TRAP.

No. 928,649.　　　Specification of Letters Patent.　　　Patented July 20, 1909.

Application filed July 25, 1908. Serial No. 445,302.

*To all whom it may concern:*

Be it known that I, MARION M. FRANKS, citizen of the United States, residing at Corsicana, in the county of Navarro and State of Texas, have invented certain new and useful Improvements in Animal-Traps, of which the following is a specification.

My invention relates to new and useful improvements in animal traps and more particularly to that class of traps used to capture small animals and rodents.

The object of my invention is to provide a trap of the character described which when it is set, supports a cage above the ground under spring tension. The animal in attempting to secure the bait will trip a lever and release the cage which will be forced to the ground by the spring catching the animal as it does so.

Another object of my invention is to provide an animal trap which will be strong, durable, light, simple and efficient and one in which the several parts will not get out of working order.

With these and other objects in view, my invention has relation to certain novel features of construction and operation an example of which is described in the following specification and illustrated in the accompanying drawings, wherein:

Figure 1 is a side elevation showing the trap set for action, Fig. 2 is a side elevation showing trap sprung, Fig. 3 is a plan view, and Fig. 4 is a partial sectional view of a modification of my invention showing spikes for impaling rodents.

In the drawing the numeral 1 designates a base on which the uprights 2 are carried. Horizontal cross bars 3 mounted on the uprights form a support for a center bar 4 while horizontal cross bars 5 running at right angles to 3 connect the same. A cross bar 6 passes below the bar 3 at an angle and connects two of the uprights. A plunger rod 7 passes through the center bar 4 and has connection at its lower end with a plunger head 8 which carries a suitable cage 9 for capturing the animals. A spring 10 is fastened to the other end of the plunger rod and has connection with the center beam 4. A pointed rod 11 adapted to hold a suitable bait carries a notch 12 fixed to engage over the cross beam 6. A similar notch 14 on rod 11 slightly above the notch 12 is arranged to engage with a lever 15 which in turn engages with a notch 16 arranged in the plunger rod 7 near its center. A suitable flexible connection 17 for securing the lever 15 has connection with the cross bar 5.

In the modification shown in Fig. 4 the uprights are not fastened to a base but are arranged to be driven in to the ground, spikes 18 extending downwardly from the plunger head, are fixed so that when the head descends the spikes will impale any animal beneath the plunger head.

To set the trap the plunger rod 7 is first raised until the notch 16 is above the surface of the center beam 4. One end of the lever 15 is then set in the notch 16 and the other end is held down by the rod 11 which has previously been baited with a suitable material.

It is obvious that when the animal endeavors to secure the bait a slight movement of the rod 11 will break its engagement with the cross bar 6, allow the lever 15 to slip out of the notches 14 and 16 and thus allow the head to descend.

What I claim, is:

1. In an animal trap, upright supports, a plunger head slidably mounted between the supports, a fixed cross support at the upper ends of the uprights, a plunger rod extending from the head up through the cross support and projecting above the same, a coiled spring surrounding the projecting portion of the plunger rod and attached to the upper end thereof, a trigger adapted to engage the plunger rod, a bait rod extending up through the plunger head and adapted to engage the trigger and a support for the bait rod above the plunger head.

2. In an animal trap, upright supports, a plunger head mounted to slide vertically between the supports, a fixed cross support at the upper ends of the uprights, a cross bar extending between two of the uprights, a plunger rod extending up through the cross support and projecting above the same, the rod being attached to the plunger head, a coiled spring surrounding the plunger rod above the cross support, the upper end of the spring being secured to the upper end of the rod and the lower end of the spring secured to the cross support, a trigger adapted to engage the plunger rod, and a bait rod extending up through the plunger head adapted to engage the trigger and rest on the cross bar.

In testimony whereof I have signed my name to this specification in the presence of two subscribing witnesses.

MARION M. FRANKS.

Witnesses:
  JAMES C. THOMAS,
  TALMAGE VIA.